No. 709,681.  
A. L. RIKER.  
SAFETY DEVICE FOR MOTOR VEHICLES.  
(Application filed Mar. 2, 1900.)  
Patented Sept. 23, 1902.

(No Model.)

Witnesses:
J. E. Coleman
W. L. Clark

Inventor:
Andrew L. Riker,
By Hermann F. Cuntz
his Att'y.

THE NORRIS PETERS CO., PHOTO-LITHO., WASHINGTON, D. C.

UNITED STATES PATENT OFFICE.

ANDREW L. RIKER, OF NEW YORK, N. Y., ASSIGNOR, BY MESNE ASSIGNMENTS, TO MORTON TRUST COMPANY, TRUSTEE, A CORPORATION OF NEW YORK.

SAFETY DEVICE FOR MOTOR-VEHICLES.

SPECIFICATION forming part of Letters Patent No. 709,681, dated September 23, 1902.

Application filed March 2, 1900. Serial No. 7,119. (No model.)

*To all whom it may concern:*

Be it known that I, ANDREW L. RIKER, of the city of New York, State of New York, have invented a new and useful Safety Device for Motor-Vehicles, which invention is fully set forth in the following specification.

This invention is a safety device for motor-vehicles. It has sometimes happened that the attendant is accidentally thrown from his seat while his vehicle is in motion, leaving it to continue ungoverned down a crowded thoroughfare. It has also happened that a runaway dashes against an automobile at rest and the jar starts the motor and propels the vehicle or mischievous persons meddling with the vehicle push the starting-lever, with the same results. Such accidents are exceedingly objectionable and dangerous, and I propose to render them impossible by rendering the vehicle incapable of propulsion at all times and under all circumstances except when the attendant is in place and wishes his vehicle to be driven.

My invention consists in employing means for checking or preventing movement of the vehicle, the means being controlled by a safety device normally held (as by spring action) in the "safety" position and moved and held in the "running" position only by the voluntary act of the attendant.

The means for holding the vehicle stationary (called hereinafter "controlling" means) may consist of means for cutting off the motive supply or in any other manner rendering the motor inactive, or means for locking the vehicle-wheels or other moving part, as by a brake or otherwise, or means for disconnecting the gearing between the motor and the vehicle-wheel or other driven part.

The safety device (called hereinafter the "switch") may consist of a spring-supported seat or a pedal or a lever or any other means for applying force or pressure. The switch acts upon the controlling means through a connecting device that may be either electrical or mechanical.

Figure 1:
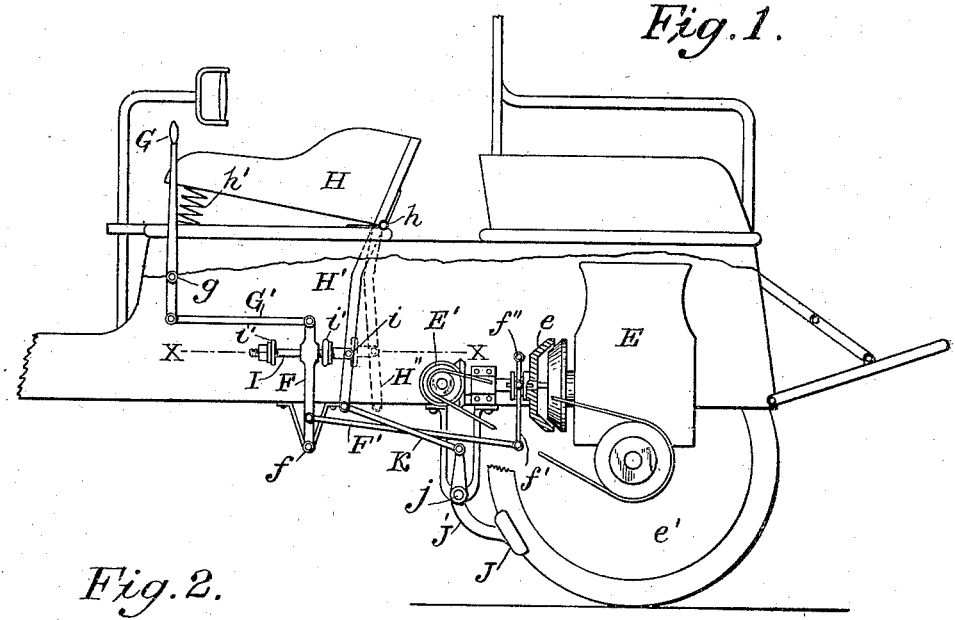
Figure 2:
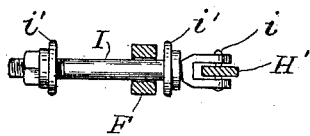
Figure 3:
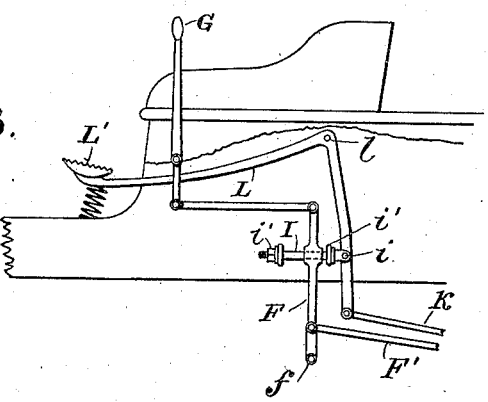

In the drawings annexed hereto and constituting a part of this specification, Figure 1 is a side elevation, largely diagrammatic, showing the embodiment of my invention. Fig. 2 is a detail through the line $x\,x$ of Fig. 1. Fig. 3 shows a modification of one of the details.

Referring to Figs. 1 and 2, the motor E drives gear E' through a clutch $e$, the motion being transmitted (as by a sprocket-chain) to the vehicle-wheel $e'$. A lever F, pivoted at $f$ to a fixed part of the vehicle, serves to shift clutch $e$ by means of link F' and lever $f'$, the latter pivoted at $f''$. An operating-lever G, extending within reach of the attendant, is pivoted at $g$ and moves lever F through link G'. Throwing lever G forward shifts the clutch $e$ into engagement to propel the vehicle. The seat H, pivoted at $h$, is supported by springs $h'$. An arm H' is fastened to the seat and serves in its normal position to prevent lever G being thrown forward to start the vehicle. A link I, pivoted to arm H' at $i$, passes freely through an eye in lever F, the latter being limited in its play by stops $i'$. When the attendant takes his seat, springs $h'$ are compressed and arm H' moved into the position indicated by dotted lines H''. Lever G can then be moved, owing to its play on link I, to start the vehicle. This Fig. 1 illustrates also the employment of a brake for locking the vehicle. J is a brake carried on lever J', that is pivoted at $j$ to a fixed part of the vehicle, and link K connects this lever J' with arm H'. Normally brake J is held against the vehicle-wheel or other suitable moving part; but when arm H' is moved to the rear, as above, the brake is released.

Fig. 3 shows a pedal as a substitute for arm H'. In this construction the seat need not be movable, as in Fig. 1; but by depressing lever L (pivoted at $l$) through pedal L' the brake is released and lever G may be thrown forward to cause engagement of clutch $e$.

Any automatic brake controlled by the safety-switch may be advantageously employed with the various forms of my invention, as it will serve to bring the vehicle to an immediate standstill, even on a downgrade, as soon as the attendant removes the force or pressure from the switch. It is obvious that many modifications may be employed in the brake, as well as in the switch, in the transmitting mechanism, and in the controlling means, without in any case departing from the spirit of my invention, which consists in employing certain of these elements in a construction whereby the vehicle is rendered normally incapable of propulsion and can be propelled only when and as long as the attendant is applying force or pressure to hold the switch in its "open" or running position.

In the form of vehicle shown in Fig. 1, where a clutch is used to disconnect the engine from the transmission mechanism, a spring and locking mechanism usually constitutes a part of the means for operating the clutch. An engine having considerable vibration is also a usual adjunct in this type of vehicle, and in the ordinary means of control the lever operated by the occupant to release the clutch when he leaves the vehicle is not infrequently jarred loose from its latch and the clutch thereby accidentally applied. This is due to the fact that the engine for convenience is allowed to continue to run while the occupant has left the vehicle, and the jarring of the vehicle will sometimes accomplish the dangerous result just mentioned. A seat-operated switch or controlling device, as herein shown and described, becomes on this account of great importance to positively prevent the throwing of the clutch except when the occupant is in the vehicle.

Having thus described my invention, I claim—

1. In a motor-vehicle, a motor, a driven road-wheel, intermediate transmission mechanism and a clutch between said transmission mechanism and the motor, means under the control of the occupant to apply and disconnect the clutch to propel the vehicle, and automatic means to release said clutch upon rising of the occupant from the seat of the vehicle.

2. In a motor-vehicle, a motor, a driven road-wheel, intermediate transmission mechanism and a clutch between said transmission mechanism and the motor, means under the control of the occupant to apply and disconnect the clutch to propel the vehicle, and automatic means to release said clutch, a brake for said vehicle, and means for applying said brake simultaneously with the automatic release of the clutch.

3. In a motor-vehicle, a motor of the type adapted to operate irrespective of variations in speed or stopping of the vehicle, a driven road-wheel, clutch connections to make or interrupt transmission of power from the engine, automatic means to release the connections, means under the control of the occupant to effect connections between the motor and the driven wheel, a brake for retarding the vehicle and automatic means for applying the brake.

4. In a motor-vehicle, a driving-motor and a driven road-wheel, intermediate transmission mechanism and a clutch to operatively connect or disconnect the power-transmission system, a single operating connection for said clutch and a plurality of means for actuating said connections, including an automatic means.

5. In a motor-vehicle, a driving-motor and a driven road-wheel, intermediate transmission mechanism and a clutch to operatively connect or disconnect the power-transmission system, a single operating connection for said clutch, a plurality of means for actuating said connections including an automatic means, a brake and means operating with said automatic connections to apply the brake upon the release of the clutch.

6. In a motor-vehicle, an engine adapted to rotate upon the stopping of the vehicle, a friction-clutch for disconnecting said engine from the power-transmission mechanism, a brake for retarding the vehicle, an automatic means for releasing said vehicle-clutch and applying the brake, said means including a spring-actuated seat adapted to be released upon removing the weight of the occupant.

In testimony whereof I have signed this specification in the presence of two subscribing witnesses.

ANDREW L. RIKER.

Witnesses:
C. A. L. MASSIE,
WILLIAM E. HILLS.